United States Patent
Wang

(10) Patent No.: US 12,276,795 B2
(45) Date of Patent: Apr. 15, 2025

(54) HEAD-MOUNTED DISPLAY DEVICE, TRACKING SYSTEM, AND TRACKING METHOD

(71) Applicant: HTC Corporation, Taoyuan (TW)

(72) Inventor: Yun-Ting Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 293 days.

(21) Appl. No.: 17/988,763

(22) Filed: Nov. 17, 2022

(65) Prior Publication Data

US 2024/0168289 A1    May 23, 2024

(51) Int. Cl.
G09G 5/00 (2006.01)
G02B 27/01 (2006.01)
G06F 3/01 (2006.01)

(52) U.S. Cl.
CPC ......... *G02B 27/0172* (2013.01); *G06F 3/013* (2013.01); *G02B 2027/0138* (2013.01); *G02B 2027/0187* (2013.01)

(58) Field of Classification Search
CPC ........ G02B 27/0172; G02B 2027/0138; G06F 3/013
USPC .......................................................... 345/8
See application file for complete search history.

(56) References Cited

U.S. PATENT DOCUMENTS

| | | | |
|---|---|---|---|
| 2016/0155231 A1* | 6/2016 | Raghoebardajal | G06T 7/70 382/195 |
| 2021/0110614 A1* | 4/2021 | Shahrokni | G06T 15/00 |
| 2021/0141448 A1 | 5/2021 | Woods | |

FOREIGN PATENT DOCUMENTS

| | | |
|---|---|---|
| CN | 110622107 | 12/2019 |
| CN | 110785688 | 2/2020 |
| TW | 201909030 | 3/2019 |
| TW | 201915445 | 4/2019 |

OTHER PUBLICATIONS

"Office Action of Taiwan Counterpart Application", issued on Aug. 29, 2023, p. 1-p. 9.

* cited by examiner

*Primary Examiner* — Jonathan M Blancha
(74) *Attorney, Agent, or Firm* — JCIPRNET

(57) ABSTRACT

A head-mounted display device is provided. The head-mounted display device includes a camera, a controller, and a display. The camera is configured to obtain an environment image of an environment around a user. The controller is configured to extract a plurality of feature points from the environment image and output an analysis result of a user pose of the user based on the plurality of feature points. The display is configured to display the environment image based on the analysis result.

16 Claims, 4 Drawing Sheets

HEAD-MOUNTED DISPLAY DEVICE, TRACKING SYSTEM, AND TRACKING METHOD

BACKGROUND

Technical Field

The disclosure relates to a head-mounted display (HMD) device; particularly, the disclosure relates to a head-mounted display device, a tracking system, and a tracking method.

Description of Related Art

In order to bring an immersive experience to users, various technologies, such as augmented reality (AR) and virtual reality (VR), are constantly being developed. AR technology allows users to bring virtual elements to the real-world. VR technology allows users to enter a whole new virtual world to experience a different life. Wearable devices are often used to provide this kind of immersive experience. However, sometimes the environment is not friendly to the detection mechanism of the wearable devices and thereby bringing the user unpleasant experience.

SUMMARY

The disclosure is direct to a head-mounted display device, a tracking system, and a tracking method, so as to improve the user experience.

In this disclosure, a head-mounted display device is provided. The head-mounted display device includes: a camera, configured to obtain an environment image of an environment around a user; a controller, configured to extract a plurality of feature points from the environment image and output an analysis result of a user pose of the user based on the plurality of feature points; and a display, configured to display the environment image based on the analysis result.

In this disclosure, a tracking system is provided. The tracking system includes: a first object; a second object; a head-mounted display device, including: a camera, configured to obtain an environment image of an environment around a user, wherein the first object and the second object are disposed in the environment; a processor, configured to extract a plurality of feature points from the environment image and output an analysis result of a user pose of the user based on the plurality of feature points, wherein the plurality of feature points includes a plurality of first feature points corresponding to the first object and a plurality of second feature points corresponding to the second object; and a display, configured to display the environment image based on the analysis result.

In this disclosure, a tracking method is provided. The tracking method is adapted to determine a playing area of a head-mounted display device and the tracking method includes:
  obtaining an environment image of an environment around a user; extracting a plurality of feature points from the environment image; outputting an analysis result of a user pose of the user based on the plurality of feature points; and displaying the environment image based on the analysis result.

Based on the above, the feature points of the environment around the user are analyzed and as a result the user experience is improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
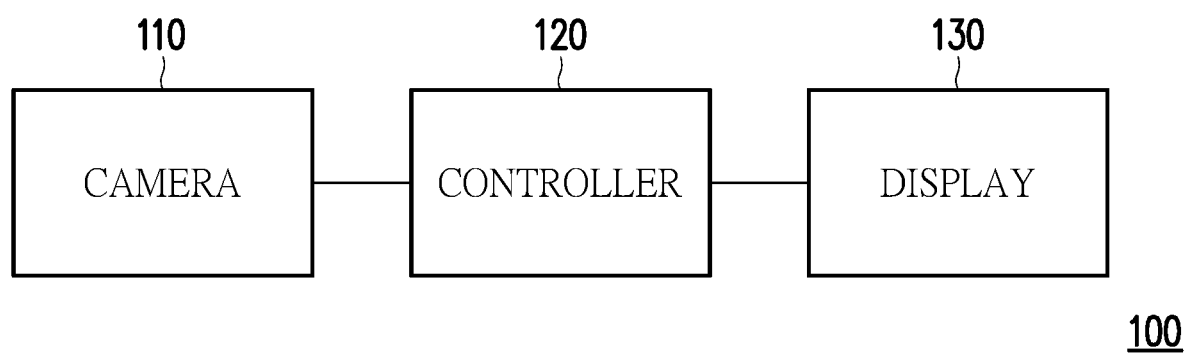
FIG. 1 is a schematic diagram of a head-mounted display device according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

FIG. 1 is a schematic diagram of a head-mounted display device according to an embodiment of the disclosure. With reference to FIG. 1, a head-mounted display device 100 includes a camera 110, a controller 120, and a display 130. The camera 110 is configured to obtain an environment image of an environment around a user. The controller 120 is configured to extract a plurality of feature points from the environment image and output an analysis result of a user pose of the user based on the plurality of feature points. The display 130 is configured to display the environment image based on the analysis result. In this manner, analyzing whether the environment is suitable for the head-mounted display device 100 or not is achieved and provides related information to the user. Therefore, the user experience may be improved.

In one embodiment, the head-mounted display device 100 includes, for example, a wearable head-mounted display (HMD), wearable glasses (e.g., AR/VR goggles), an electronic device, other similar devices, or a combination of these devices. However, the disclosure is not limited thereto.

In one embodiment, the camera 110 includes, for example, a complementary metal oxide semiconductor (CMOS) camera or a charge coupled device (CCD) camera, and the auxiliary light unit comprises an infrared irradiation unit. However, this disclosure is not limited thereto. In one embodiment, the camera 110 may be disposed on a wearable head-mounted display (HMD), wearable glasses (e.g., AR/VR goggles), an electronic device, other similar devices, or a combination of these devices. This disclosure is not limited thereto.

In one embodiment, the controller 120 includes, for example, a microcontroller unit (MCU), a central processing unit (CPU), a microprocessor, a digital signal processor (DSP), a programmable controller, a programmable logic device (PLD), other similar devices, or a combination of these devices. The disclosure is not limited thereto. In addition, in an embodiment, each of functions of the controller 120 may be achieved as multiple program codes. The program codes are stored in a memory, and executed by the controller 120. Alternatively, in an embodiment, each of the functions of the controller 120 may be achieved as one or more circuits. The disclosure does not limit the use of software or hardware to achieve the functions of the controller 120. In one embodiment, the controller 120 may be disposed on a wearable head-mounted display (HMD), wearable glasses (e.g., AR/VR goggles), an electronic device, other similar devices, or a combination of these devices. However, the disclosure is not limited thereto.

Figure 2:
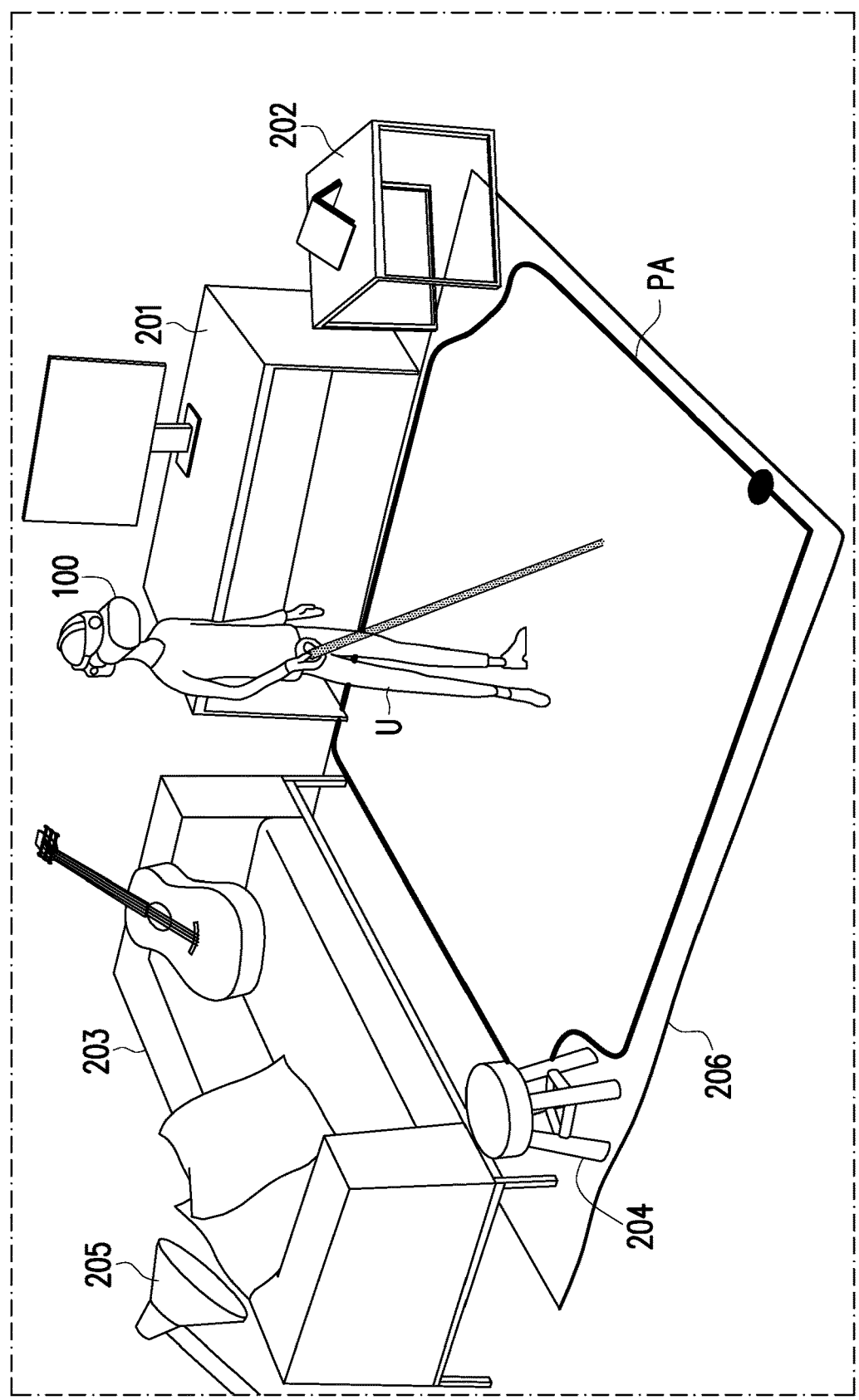
FIG. 2 is a schematic diagram of a scenario according to an embodiment of the disclosure.

FIG. 2 is a schematic diagram of a scenario according to an embodiment of the disclosure. With reference to FIG. 1 and FIG. 2, a scenario 200 depicts that a user U wears the head-mounted display device 100 of FIG. 1. In the scenario 200, a plurality of objects may be disposed in the environment around the user U. The plurality of objects may include a plurality of first objects 201, 202, 203, 204, 205, and 206. It is noted that, the first objects 201, 202, 203, 204, 205, and 206 may be stable, fixed or stationary objects, such as a desk, a table, a couch, a stool, a chair, a bench, a lamp, a carpet, and so on. In one embodiment, the first object 201 is a desk, the first object 202 is a table, the first object 203 is a couch, the first object 204 is a stool, the first object 205 is a lamp, and the first object 206 is a carpet. However, this disclosure is not limited thereto.

In one embodiment, the first objects 201, 202, 203, 204, 205, and 206 may be pre-stored in a first object database in a memory of the head-mounted display device 100. That is, the controller 120 is configured to distinguish whether the objects in the environment is one of the first objects 201, 202, 203, 204, 205, and 206 or not based on the first object database. In another embodiment, the first objects 201, 202, 203, 204, 205, and 206 may be determined by the controller 120 based on an object displacement of an object in the environment from a previous time period to a current time period being smaller than a predetermined first object displacement or not. That is, the controller 120 is configured to determine an object in the environment is one of the first objects 201, 202, 203, 204, 205, and 206 in response to an object displacement of the object from a previous time period to a current time period being smaller than a predetermined first object displacement.

Further, the plurality of objects in the environment may include a plurality of second objects. Unlike the first objects 201, 202, 203, 204, 205, and 206, the second objects tend to be less stable than the first objects 201, 202, 203, 204, 205, and 206. In other words, the position, shape, or content of the second objects may change over time. In one embodiment, the second objects may be anything other than the first objects 201, 202, 203, 204, 205, and 206. In one embodiment, the second objects may include a moving object, a picture on a display, or scenery outside the window. However, this disclosure is not limited thereto.

After the user U wears the head-mounted display device 100, the camera 110 of the head-mounted display device 100 may obtain an environment image of the environment around the user U. The controller 120 is configured to extract a plurality of feature points from the environment image. The plurality of feature points may include a plurality of first feature points (also called target feature points) corresponding to the first objects 201, 202, 203, 204, 205, and 206 and a plurality of second feature points (also called natural feature points) corresponding to the second objects. In addition, the controller 120 is configured to output an analysis result of a user pose of the user U based on the plurality of feature points. Moreover, the display 130 is configured to display the environment image based on the analysis result.

Specifically, the controller 120 is configured to obtain a first pose of the user U according to the plurality of first feature points and a second pose of the user U according to the plurality of second feature points. Then, the controller 120 is configured to generate the analysis result by determining whether the first pose is same as the second pose.

In one embodiment, the controller 120 is configured to obtain a first location of the user U based on the first pose and a second location of the user U based on the second pose. The location of the user U may be defined as a central point of the user U or any part of the user U and this disclosure does not limit the definition of the location of the user U. Based on the first location and the second location, the controller 120 is configured to generate the analysis by determining whether a location distance between the first location with the second location being smaller than a threshold distance or not. In response to the location distance being smaller that the threshold distance, the controller 120 is configured to determine that the first pose is same as the second pose. In response to the location distance being not smaller that the threshold distance, the controller 120 is configured to determine that the first pose is not same as the second pose.

In another embodiment, the controller 120 is configured to obtain a first shape of the user U based on the first pose and a second shape of the user U based on the second pose. For example, the shape of the user U may be an outline of the body of the user U or an outline of the hand of the user U. However, this disclosure is not limited thereto. Based on the first shape and the second shape, the controller 120 is configured to generate the analysis by determining whether a shape difference between the first shape with the second shape being smaller than a threshold shape difference or not.

It is worth mentioned that, the controller 120 may be also configured to utilized angles, and movements of the first pose and the second pose to determine whether the first pose is not same as the second pose or not. That is, this disclosure does not limit the parameters of the first pose of the second pose used to determine whether first pose is not same as the second pose or not.

It is noted that, since the first pose and the second pose are obtained based on at least one first object 201, 202, 203, 204, 205, or 206 (which is more stable) and at least one second object (which is less stable), the first pose may be regarded as a standard of the user pose and the second pose may be regarded as a checking mechanism for the environment. In other words, the first feature points corresponding to the at least one first object 201, 202, 203, 204, 205, or 206 are more recognizable and stable and thereby provide robust and precise features, while the second feature points corresponding to the at least one second object tends to be less recognizable and stable. Under these circumstances, if the second pose is still the same as the first pose, it means the environment provides enough information even if the at least one first object 201, 202, 203, 204, 205, or 206 is removed. On the other hand, if the second pose is different from the first pose, it means the environment does not provide enough information so that the head-mounted display device 100 is not able to recognize the pose of the user U properly.

In addition, the display 130 may display notifications based on the analysis result. In one embodiment, when the first pose is same as the second pose, the analysis result may include a first notification for notifying the user U to remove at least one first object 201, 202, 203, 204, 205, or 206 from the environment. That is, since the environment already provides enough information, the at least one first object

201, 202, 203, 204, 205, or 206 may be removed to provide a better user experience by increasing an area of a playing area PA. In one embodiment, when the first pose is different from the second pose, the analysis result may include a second notification for notifying the user U to add at least one third object into the environment. That is, since the environment does not provide enough information, more objects may be added into the environment to provide more features to the head-mounted display device 100 for recognizing the pose of the user U properly. For example, the third object may include at least one of a sticker, a tracker and a specific pattern, but this disclosure is not limited thereto. In this manner, a good condition of the environment around the user U is assured and thereby improving the user experience.

In one embodiment, the head-mounted display device 100 may be configured to determine an area of a playing area PA based on the plurality of feature points. That is, the head-mounted display device 100 may determine which area of the environment is suitable for enjoying the service provided by the head-mounted display device 100 based on the feature points corresponding to the objects in the environment around the user U.

In one embodiment, the head-mounted display device 100 may include a network module. For example, the network module may include, for example, a wired network module, a wireless network module, a Bluetooth module, an infrared module, a radio frequency identification (RFID) module, a Zigbee network module, or a near field communication (NFC) network module, but the disclosure is not limited thereto. The controller 120 is configured to send the analysis result through the network module to an external server. The external server may be accessed by an authorized person to understand the environment around the user U and thereby provide service or help to the user U.

Figure 3:
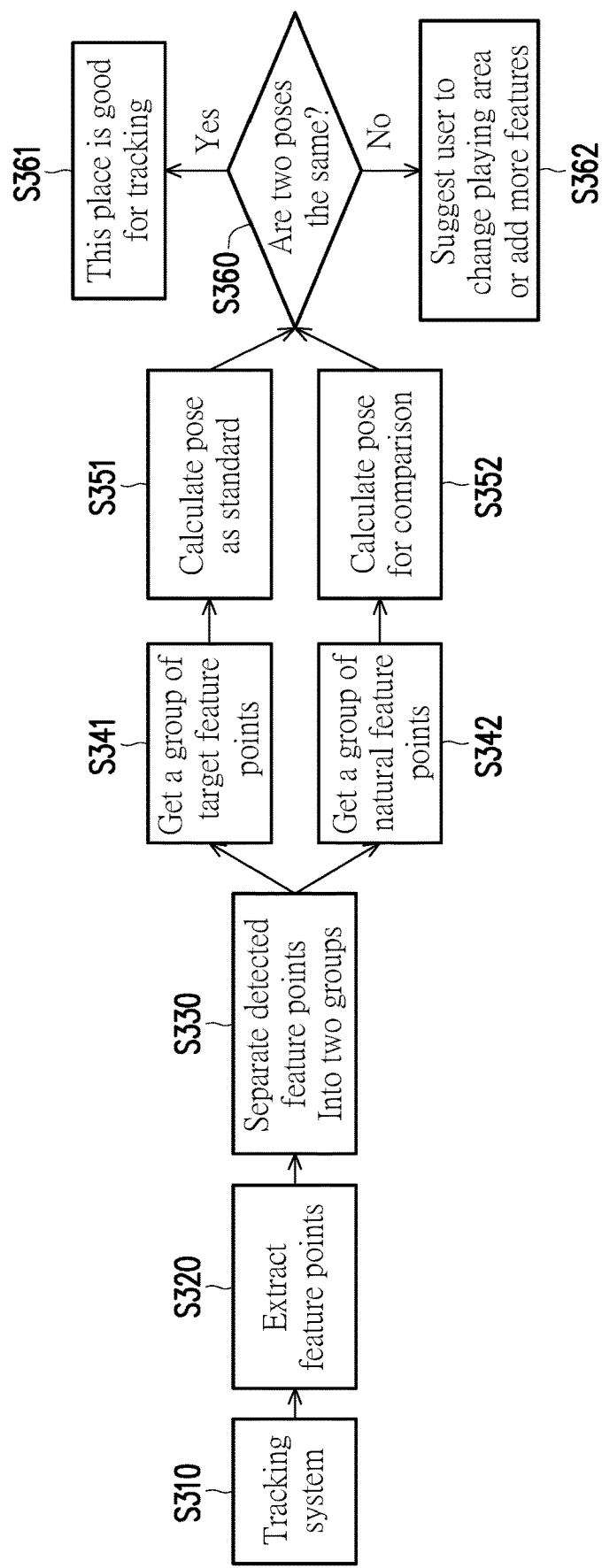
FIG. 3 is a schematic flowchart of a tracking system according to an embodiment of the disclosure.

FIG. 3 is a schematic flowchart of a tracking system according to an embodiment of the disclosure. With reference to FIG. 1 to FIG. 3, FIG. 3 depicts a flowchart of an operation process of a tracking system. The tracking system may include a first object, a second object, and the head-mounted display device 100. The details of the head-mounted display device 100 may be referred to the descriptions of FIG. 1 to FIG. 2, while the details are not redundantly described seriatim herein.

In a step S310, the tracking system may be initialized to obtain an environment image by the camera of the head-mounted display device 100. In a step S320, a plurality of feature points may be extracted/detected from the environment around the user U by the controller 120 of the head-mounted display device 100. In a step S330, the detected feature points may be separated into two groups by the controller 120.

It is noted that, the controller 120 is configured to get a group of target feature points from the feature points in a step S341 and is configured to calculate/obtain a first pose as a standard in a step S351. Further, the controller 120 is configured to get a group of natural feature points from the feature points in a step S342 and is configured to calculate/obtain a second pose for comparison in a step S352.

In a step S360, the controller 120 is configured to determine whether the first pose and the second pose are the same or not. In a step S361, if the first pose is same as the second pose, the controller 120 may notify the user U that this place (the environment) is good for tracking by displaying a notification through the display 130. In a step S362, if the first pose is different as the second pose, the controller 120 may suggest the user U to change the playing area A or add more features into the environment by displaying a notification through the display 130. In this manner, a good condition of the environment around the user U is assured and thereby improving the user experience.

Figure 4:
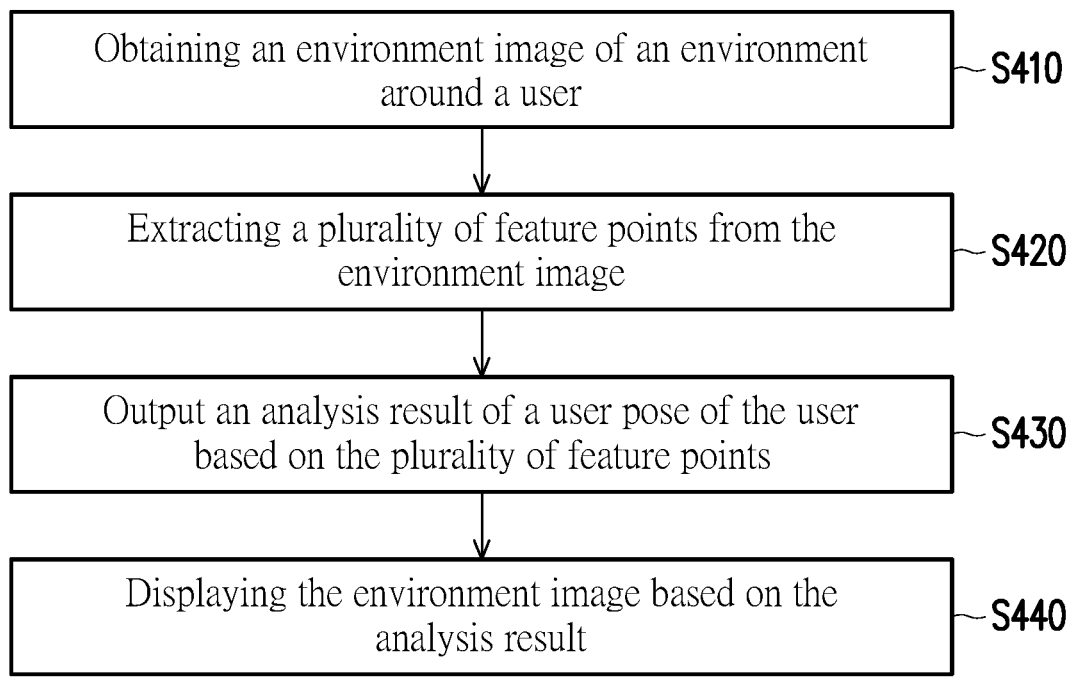
FIG. 4 is a schematic flowchart of a tracking method according to an embodiment of the disclosure.

FIG. 4 is a schematic flowchart of a tracking method according to an embodiment of the disclosure. With reference to FIG. 1 to FIG. 4, the tracking method includes a step S410, a step S420, a step S430, and a step S440.

In the step S410, an environment image of an environment around a user U is obtained by a camera 110 of a head-mounted display device 100. In the step S420, a plurality of feature points are extracted from the environment image by a controller 120 of the head-mounted display device 100. In the step S430, an analysis result of a user pose of the user U based on the plurality of feature points is output by the controller 120. In the step S440, the environment image based on the analysis result is displayed by a display 130 of the head-mounted display device 100. In this manner, analyzing whether the environment is suitable for the head-mounted display device 100 or not is achieved and provides related information to the user. Therefore, the user experience may be improved.

In addition, the implementation details of the tracking method of FIG. 4 may be referred to the descriptions of FIG. 1 to FIG. 3 to obtain sufficient teachings, suggestions, and implementation embodiments, while the details are not redundantly described seriatim herein.

In summary, according to the head-mounted display device, the tracking system, and the tracking method, by analyzing the feature points in the environment around the user, a good condition of the environment around the user is assured and thereby improving the user experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A head-mounted display device, comprising:
 a camera, configured to obtain an environment image of an environment around a user;
 a controller, configured to:
  extract a plurality of feature points from the environment image and output an analysis result of a user pose of the user based on the plurality of feature points, wherein the plurality of feature points comprises a plurality of first feature points and a plurality of second feature points;
  obtain a first pose of the user according to the plurality of first feature points and a second pose of the user according to the plurality of second feature points; and
  generate the analysis result by determining whether the first pose is same as the second pose; and
 a display, configured to display the environment image based on the analysis result.

2. The head-mounted display device according to claim 1, wherein
 the controller is further configured to:
 obtain a first location of the user based on the first pose and a second location of the user based on the second pose; and
 generate the analysis result by determining whether a location distance between the first location with the second location being smaller than a threshold distance or not.

3. The head-mounted display device according to claim 2, wherein
the controller is further configured to:
determine the first pose is same as the second pose in response to the location distance being smaller than the threshold distance.

4. The head-mounted display device according to claim 3, wherein the analysis result comprises a first notification for notifying the user to remove at least one first object corresponding to the plurality of first feature points from the environment.

5. The head-mounted display device according to claim 4, wherein the first object comprises at least one of a desk, a table, a couch, a stool, a chair, a bench, a lamp, and a carpet.

6. The head-mounted display device according to claim 2, wherein
the controller is further configured to:
determine the first pose is not same as the second pose in response to the location distance being not smaller than the threshold distance.

7. The head-mounted display device according to claim 6, wherein the analysis result comprises a second notification for notifying the user to add at least one third object into the environment, and the least third object is different from the at least one first object corresponding to the plurality of first feature points and at least one second object corresponding to the plurality of second feature points.

8. The head-mounted display device according to claim 7, wherein the third object comprises at least one of a sticker, a tracker and a specific pattern.

9. The head-mounted display device according to claim 1, wherein
the head-mounted display device further comprises a network module, and
the controller is further configured to send the analysis result through the network module to an external server.

10. The head-mounted display device according to claim 1, wherein
the controller is further configured to:
determine an area of a playing area based on the plurality of feature points.

11. A tracking system, comprising:
a first object;
a second object;
a head-mounted display device, comprising:
a camera, configured to obtain an environment image of an environment around a user, wherein the first object and the second object are disposed in the environment;
a processor, configured to:
extract a plurality of feature points from the environment image and output an analysis result of a user pose of the user based on the plurality of feature points, wherein the plurality of feature points comprises a plurality of first feature points corresponding to the first object and a plurality of second feature points corresponding to the second object;
obtain a first pose of the user according to the plurality of first feature points and a second pose of the user according to the plurality of second feature points; and
generate the analysis result by determining whether the first pose is same as the second pose; and
a display, configured to display the environment image based on the analysis result.

12. The head-mounted display device according to claim 11, wherein
the controller is further configured to:
obtain a first location of the user based on the first pose and a second location of the user based on the second pose; and
generate the analysis result by determining whether a location distance between the first location with the second location being smaller than a threshold distance or not.

13. The head-mounted display device according to claim 12, wherein
the controller is further configured to:
determine the first pose is same as the second pose in response to the location distance being smaller than the threshold distance.

14. The head-mounted display device according to claim 12, wherein
the controller is further configured to:
determine the first pose is not same as the second pose in response to the location distance being not smaller than the threshold distance.

15. The head-mounted display device according to claim 11, wherein
the head-mounted display device further comprises a network module, and
the controller is further configured to send the analysis result through the network module to an external server.

16. A tracking method, adapted to determine a playing area of a head-mounted display device, wherein the tracking method comprises:
obtaining an environment image of an environment around a user;
extracting a plurality of feature points from the environment image;
outputting an analysis result of a user pose of the user based on the plurality of feature points, wherein the plurality of feature points comprises a plurality of first feature points and a plurality of second feature points;
obtaining a first pose of the user according to the plurality of first feature points and a second pose of the user according to the plurality of second feature points;
generating the analysis result by determining whether the first pose is same as the second pose; and
displaying the environment image based on the analysis result.

* * * * *